Figure 1:
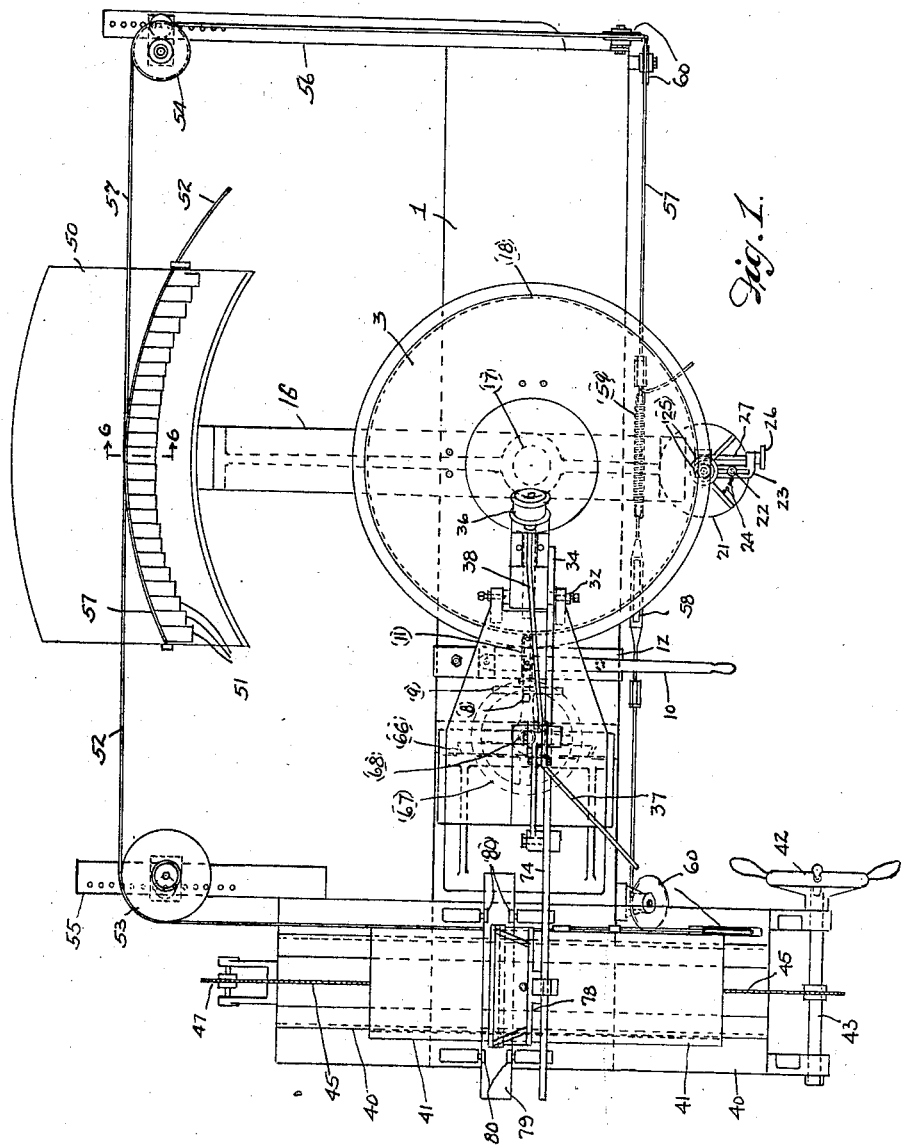

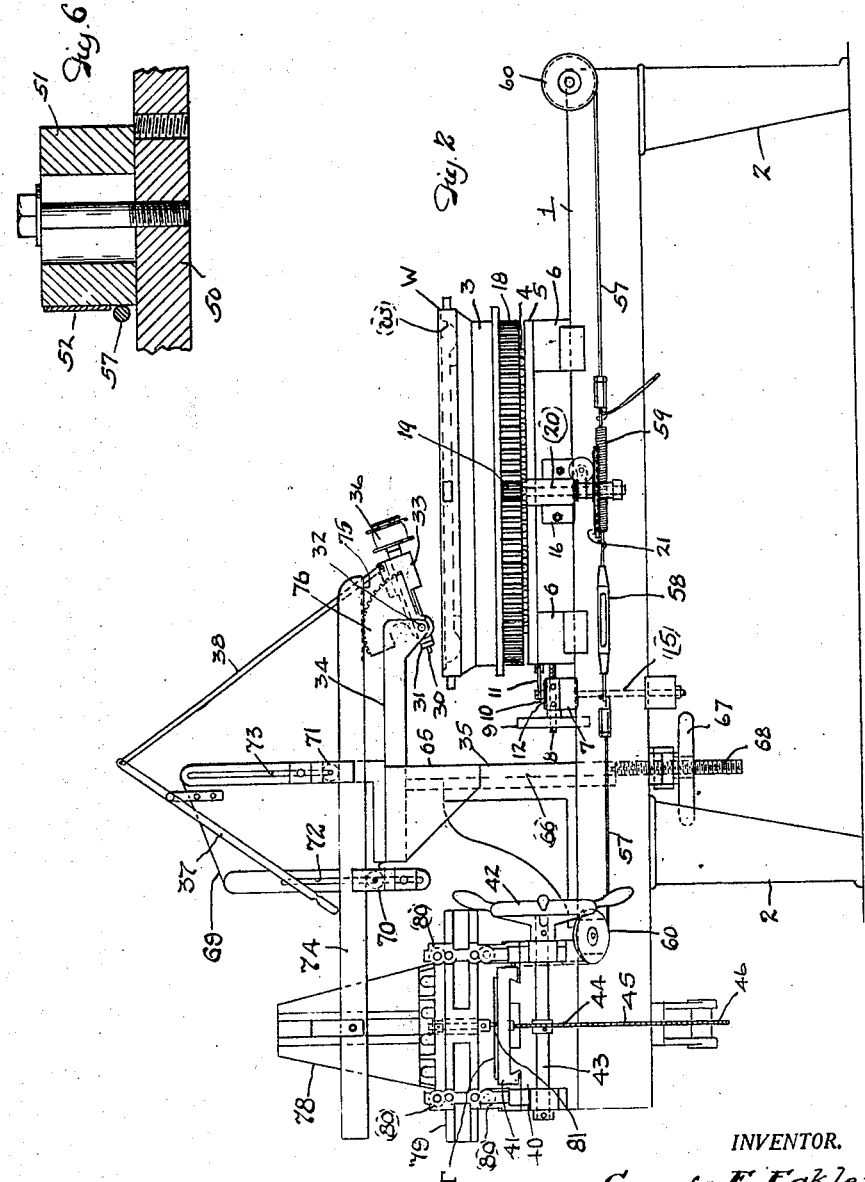

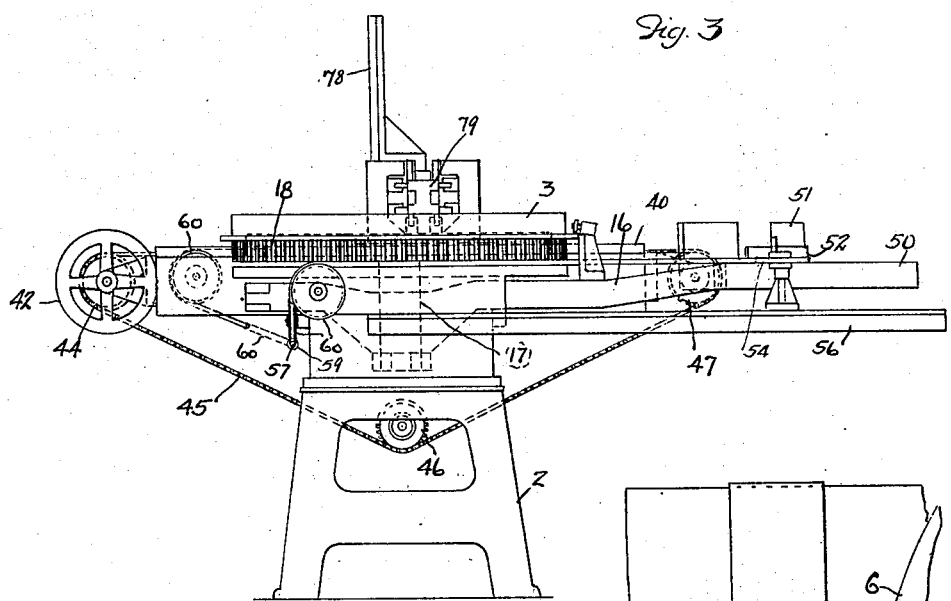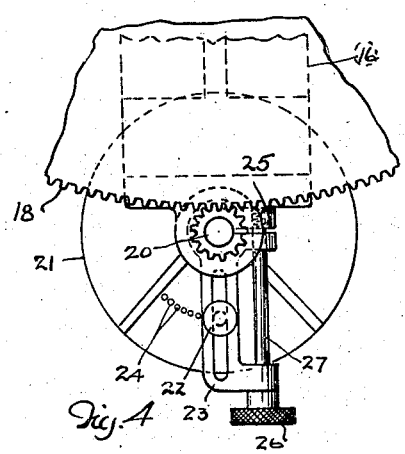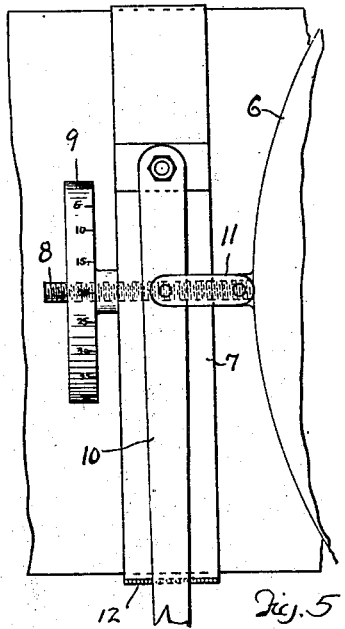

Patented Sept. 23, 1924.

1,509,287

UNITED STATES PATENT OFFICE.

GEORGE E. ECKLER, OF AKRON, OHIO, ASSIGNOR TO THE FRANZ FOUNDRY & MACHINE COMPANY, OF AKRON, OHIO, A CORPORATION OF OHIO.

ENGRAVING MACHINE.

Application filed January 19, 1922. Serial No. 530,490.

*To all whom it may concern:*

Be it known that I, GEORGE E. ECKLER, a citizen of the United States, and a resident of Akron, county of Summit, and State of Ohio, have invented a new and useful Improvement in Engraving Machines, of which the following is a specification, the principle of the invention being herein explained and the best mode in which I have contemplated applying that principle, so as to distinguish it from other inventions.

The present improvements relating, as indicated, to engraving mechanism, have more particular regard to the provision of a machine adapted for the engraving of tire molds, i. e., of a hollow concave surface of general annular form. As is well known, the threads of tire casings are frequently of rather intricate design and considerable difficulty, as well as expense, has attached to the cutting or engraving of the necessary molds used in the manufacture of such casings. Such molds are regularly formed in two complementary parts corresponding with the respective half-parts of the tire casing as cut by a plane passing through a median line encircling its tread. It accordingly is necessary that the engraving of such complementary mold parts be very accurately done if the design of the tread is to properly match when such parts are brought together in the vulcanizing press.

The object of the present invention, accordingly, is the provision of a machine that will be of simple and substantial construction and yet capable of transferring more or less automatically a design from a master pattern or template to the peculiar curved surface whereon such design requires to be engraved or cut.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Fig. 1 is a plan view of an engraving machine embodying my present improvements; Fig. 2 is a front elevation of such machine; Fig. 3 is an end elevation thereof as viewed from the right in Figs. 1 and 2; Figs. 4 and 5 are plan views on somewhat larger scale of two structural details; and Fig. 6 is a sectional detail.

The main frame of the machine, as illustrated in the aforesaid drawings, comprises a bed 1 supported at a convenient height on legs 2. The work W, consisting, as aforesaid, of a half mold, is designed to be mounted on such table approximately centrally thereof, being temporarily fixedly secured by any suitable means to a turntable 3, as shown in Fig. 2. This turntable is rotatably supported through the medium of a ball race 4 on a plate 5 carried by blocks 6 that slidably rest on the top of the bed 1 so as to be movable longitudinally thereof. The longitudinal position of the plate, and thus of the turntable and of the work relatively to the bed 1, is accurately determined with reference to a block 7 adjustably clamped to said bed by the following means, viz, a threaded stud 8 projects longitudinally of the bed from one of the blocks 6, the left-hand one as shown in Figs. 1 and 2, and passes through said block 7, having threaded on its outer end a hand wheel 9. Pivotally mounted at one end of said block 7 is a lever 10 that is connected by means of a link 11 with such adjacent block 6, a series of notches forming ratchet teeth 12 being provided on said block 7 in position to engage with a suitable projection on the under side of the lever at a point between the point of attachment of said link 11 therewith and the outer or operative end of the lever. By means of the latter, through its aforesaid link connection with block 6, it will accordingly be seen that such block may be forced to the right, as viewed in Figs. 1 and 2, until the hub of hand wheel 9 engages with block 7, such block acting as a stop to limit the movement of block 6. The engagement of the lever with the ratchet teeth 12 will then serve to hold the parts in the relative position determined by the adjustment of hand wheel 9 on threaded stud 8.

By loosening the nuts on bolts 15, whereby block 7 is clamped to the bed, the entire turntable, with the accessory parts last described, may be moved longitudinally of bed 1 into approximately the position desired for operating on the work carried by said turntable. Final adjustment of the position of the work is then effected by means of hand wheel 9, the hub thereof being tightly pressed against block 7 by means of lever 10. The position of the work thus determined, however, is that at which the full depth of the cut accomplished by the cutting tool, presently to be described, is made in the work, and the further function of the lever 10 will thus appear, viz, to move the turntable and thus the work slightly to the left from such definitive position, in order initially to bring the cutter into cutting position, it being understood that said lever will be locked only upon establishment of the cutting operation to the full depth of the cut.

For the purpose of rotating the turntable, together with the work carried thereby, about their common axis a radially extending arm 16 is provided, said arm being rotatably secured to the turntable about a spindle 17 coinciding with the axis of said turntable (see Fig. 1) and normally projecting rearwardly entirely clear of bed 1 for some distance to the rear. Said arm 16 is locked to the turntable by means that at the same time provide for the indexing of the turntable relatively to the arm, such means consisting of an external gear 18 that extends circumferentially around the turntable just above the ball race 4, and a spur pinion 19 carried by a vertical shaft 20, journaled in a suitable bearing provided in a casing attached to the front end of arm 16. It will be noted that such arm extends forwardly beyond the shaft 17 to approximately the front edge of the turntable. A disk 21, suitably graduated, is fixedly attached to the lower end of spindle 20 and serves to rotate the same, and thus the spur pinion 19, in order to turn table 3 about its axis. The ratio of said pinion to gear 18 may of course vary, but will be fixed in any particular machine; and since it may not be possible to divide up the indexing of the work into exactly an even number of turns of the pinion, adjustable means are provided for locking disk 21 and thus spindle 20 in selected rotative position relatively to the end of arm 16, whereby the turntable with the work thereon may be brought exactly to the proper position with respect to the cutter spindle in setting up the machine at the start, and such condition repeated for successive cuts. To this end a plunger pin 22 is mounted in an arm 23 that is secured to the casing in which said spindle 20 is journaled, said plunger being adapted to engage any one of a series of holes 24 in the upper face of the disk. While said arm 23 is designed to be normally non-rotatably secured to such casing, its position relatively thereto is rendered adjustable through a split clamping device 25, controlled by a small hand wheel 26 on the outer end of a screw-spindle 27. The operation whereby relative adjustment of the spindle and the disk 21 is obtained will be readily understood from the foregoing without further description.

A rotary cutter 30 constitutes the tool for engraving the annular concave surface $w$ of the tire mold W, such tool being carried by a spindle 31 so mounted as to be oscillatory about a transverse axis 32 that coincides with the axis of the transverse sectional curve formed by the intersection of the surface $w$ with a radial plane. It should be explained that in order to not confuse the showing of the parts in Fig. 2, the cutter with the housing whereby it is thus supported is shown as raised above its normal operating position. When in such position the axis 31 will coincide with the center of the transverse curve that defines the outer tread surface of the tire, such curve being regularly made on the arc of a circle.

Tool spindle 31 is journaled in a housing 33, oscillatory as aforesaid about a transverse axis 32 formed in the outer end of an arm 34 that projects horizontally over the turntable 3 from a vertically extending frame 35. The upper end of spindle 31 is provided with a pulley 36, around which a belt, (not shown) may be passed in order to drive said spindle, and thus the cutter, it being of course understood that such cutter may be driven in any other suitable manner, as for example, by means of a motor directly connected therewith. The housing 33, wherein said spindle is journaled, is sufficiently heavy to cause the same to normally tend to turn to the right, as viewed in Fig. 2, and thus raise the cutter 30 clear of the work; in order to depress the cutter into engagement with the work a hand lever 37 is pivotally attached to the upper portion of the vertical frame 35, one end of such lever being connected by means of a link 38 with the housing 33 so that upon pulling down upon the other end of the lever the housing will be turned in a counter-clockwise direction about its axis 32.

Supported upon the extreme left-hand end of the bed 1 of the machine is a transverse slideway 40, and mounted on said slideway is a slide 41, to which is attached the master pattern or template T, by which the movement of the cutter 31 across the curved surface $w$ of the work W is governed. Movement of slide 41 upon slideway 40 is effected and controlled by means of a hand wheel 42 mounted on a transverse shaft 43 at the forward end of the slideway, such shaft also carrying a sprocket wheel 44, about which passes a sprocket chain 45. Said sprocket chain is attached at one point to the under side of the slide at a point approximately midway between the ends thereof and thence passes around said sprocket wheel 44 as just described, and then in succession around wheels 46 and 47, the latter of which is mounted to the rear of the slideway 40. It will accordingly be seen that rotation of hand wheel 42 will be directly translated into longitudinal movement of the slide forwardly or backwardly, depending upon the direction of such rotation.

Longitudinal movement of slide 41 is in turn translated into oscillatory movement of turntable 3 through the medium of cable connections from said slide to the outer end of arm 16. Such cable connections will require specific description, but first it will be noted that in order to adapt the arm 16 for operation in the fashion just referred to with molds of different diameters mounted on the turntable, an arcuate contact must be secured between the outer end of such arm and the portion of the cable connections that is attached thereto. In order to provide for such arcuate contact on circles of different radii the rear extremity of arm 16 is flattened in the form of a plate 50 and provision is made for adjustably securing thereto a plurality of blocks 51 that have their upwardly directed faces rounded so that when said blocks are assembled, as shown in Fig. 1, such faces will lie on a curve approximately conforming to the arc of the desired circle. Various means may be employed for thus adjustably securing said blocks to the plate, the simplest being to provide the plate with a plurality of series of tapped holes and the blocks with slots through which set bolts extend into engagement with such holes, as shown in Fig. 6, whereby the blocks may be individually adjusted transversely of the plate and then clamped in place.

One portion 52 of the cable connections directly engaging with the assembled blocks 51 preferably consists of a steel band so as to have a flat bearing surface against such blocks and render it unnecessary to figure the thickness of such band in calculating for the relative adjustment of parts. Such band passes around a suitable pulley 53 adjustably carried by a rearwardly projecting arm 55 and has its inner end fixedly attached to the side of slide 41 near the middle thereof, while its outer end is adjustably clamped at the farther side to plate 50 to the terminal block 51. The remainder of the cable connections in question include an ordinary cable 57, in which is interposed a turnbuckle 58 and tension spring 59, said cable passing over a sheave 54 adjustably mounted on an arm 56 and being carried around the front of the machine by suitably disposed sheaves 60. The inner end of said cable is disposed so as to lie alongside, and parallel with, slide 40, to which it is attached by means of suitable clamps at approximately the mid-point on said slide, while its outer end is clamped to terminal block 51 at the opposite end of the series from the one to which the end of band 52 is clamped.

Assuming that the blocks 51 have been disposed and secured to plate 50 on the end of arm 16 so as to provide an arcuate bearing face for steel band 52 concentric with the annular curve of the cavity $w$ in the tire mold W, and that a predetermined ratio has been established between the radii of such surface and cavity, it will be evident that a template mounted on slide 41, having a corresponding ratio between the dimensions of the design thereon and those of the design as it is to be engraved or cut on the tire mold, may be employed to guide the movement of the cutter 31 in contact with the surface $w$ of such mold.

The arm 34, from which is supported the housing 33 wherein the cutter spindle is mounted, is vertically adjustable with respect to the framework 35, being carried by a head 65 fitted to a vertical slideway 66 on such framework. Such head 65, together with arm 34 and other parts carried thereby, is held in adjusted position by means of a hand wheel 67 rotatably attached to the under side of the bed 1, and having threaded engagement with a shaft 68 that projects downwardly from said head (see Fig. 2). Rising upwardly from the head 65 is a plate-like extension 69, to which is pivotally attached the lever 37 previously referred to as being operatively connected with the cutter-spindle housing 33 to oscillate same about pivotal axis 32.

Said plate also carries two transversely spaced rollers 70 and 71, respectively vertically adjustable in slots 72 and 73 and a bar 74 that lies directly above arm 34 and is guided between said rollers in a direction longitudinal of the bed 1. The right-hand end of said bar, as viewed in Fig. 2, is provided with a rack 75 that engages with a segmental gear plate fixedly attached to cutter-spindle housing 33, so that longitudinal movement of the bar and oscillatory movement of the cutter about pivotal axis 32 will be directly correlated. The other, or left-hand end of bar 74, as viewed in Fig. 2, is attached to an upwardly extending structure 78 that forms part of a slide 79 mounted between rollers 80 above slideway 40 so as to be freely movable in a direction transverse of the latter, or, in other words, transverse of the template T that, as heretofore explained, is attached to slide 41 reciprocable on said slideway.

The means provided for attachment of the bar 74 to the upwardly extending portion 78 of slide 79 permit of the vertical adjustment of said bar when rendered necessary by vertical adjustment of head 65 and of the roller guides 70 and 71, such adjustment being necessary to accommodate the bar to segmental gears 76 of different radius, such gears being interchangeably attached to the spindle housing in order to permit the ratio of the oscillatory movement of the spindle to the transverse movement of the finder to be changed to correspond with the ratio of the rotative movement of the work-holder to the longitudinal movement of said finder. Said slide 79 is also provided with a vertically adjustable downwardly directed pin 81 that forms the finder co-operative with the design on the template or pattern T.

From the foregoing description it will be seen that in order for the finder 81 to follow transverse elements of the design on the pattern or template, slide 79 will have to be reciprocated longitudinally. A simultaneous movement of the two slides, by producing a compound relative movement between the finder and pattern will similarly permit the finder to trace angular or curved portions of the design. In the operation of the machine accordingly, hand wheel 42, which controls the longitudinal movement of slide 41, and lever 37, are so manipulated as to cause finder 81 to trace various portions of the design on the template with the result, first, that as slide 41 is shifted in one direction or the other, a corresponding rotative movement will be imparted to turntable 3, and thus to the tire mold W mounted thereon through the cable connections between said slide 41 and the outer end of arm 16; and, second, that lever 37 can be swung to oscillate the cutter spindle about pivotal axis 32 only as the engagement of the finder 81, with the design on the template, will permit of longitudinally shifting movement in one direction or the other of slide 79, and thus of bar 74.

It is believed not necessary to explain further the general operation of the machine, the manner in which the several parts thereof are adjusted and operated having been already fully set forth. It will be noted, however, that all the foregoing adjustments are readily made and are of a character such as to accommodate wide variation in the dimensions of the tire molds or equivalent work being operated on, both as to the major radius of the concave surface or groove $w$ in such mold, and the radius of transverse curvature of such groove. Of course it is not necessary or practicable to have a template of length equivalent to the entire circumference of the mold groove to be cut or engraved, but it is sufficient to have such template reproduce merely a unitary portion of such design. The number of times that such unit design requires to be repeated in order to engrave or cut the entire circumference of the groove in the tire mold determines the number of times that the turntable will require to be indexed. The means provided for thus indexing the work permit of very accurate calculation in this respect and assure the perfect closing of the design.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a rotatable work-holder, a rotary cutter-spindle oscillatory about a transverse axis, and means including a template in the form of a pattern of the design to be cut, said template being adapted to correlate rotative movement of said holder and oscillatory movement of said spindle.

2. In mechanism of the character described, the combination of a rotatable work-holder, a rotary cutter-spindle oscillatory about a transverse axis, and means adapted to correlate rotative movement of said holder and oscillatory movement of said spindle, said means including a template movable in said means including a template movable in said means including a template movable in a rectilinear direction, said template being operatively connected with said holder to rotate same, and a finder movable transversely of and interengaging with said template, said finder being operatively connected with said spindle to oscillate same.

3. In mechanism of the character described, the combination of a rotatable work-holder, a rotary cutter-spindle oscillatory about a transverse axis, and means adapted to correlate rotative movement of said holder and oscillatory movement of said spindle, said means including a template movable in a rectilinear direction, cable connections between said template and said holder, a bar movable transversely of said template and operatively connected with said spindle to oscillate same, and a finder carried by said bar and interengaging with said template.

4. In mechanism of the character described, the combination of a rotatable work-holder, a rotary cutter-spindle oscillatory about a transverse axis, and means adapted to correlate rotative movement of said holder and oscillatory movement of said spindle, said means including a template movable in a rectilinear direction, cable connections between said template and said holder, a bar movable transversely of said template, and provided with a rack, a segmental gear attached to said spindle and meshing with such rack, whereby movement of said bar serves to oscillate said spindle, and a finder carried by said bar and interengaging with said template.

5. In mechanism of the character described, the combination of a turntable adapted to support a tire-mold or like article, having an annular groove of curved cross-section to be engraved, a rotary cutter-spindle oscillatorily supported about a transverse axis approximately coincident with that of such cross-sectional curve, and means including a template in the form of a pattern of the design to be cut, said template being adapted to correlate rotative movement of said table and oscillatory movement of said spindle.

6. In mechanism of the character described, the combination of a turntable adapted to support a tire-mold or like article, having an annular groove of curved cross-section to be engraved, a rotary cutter-spindle oscillatorily supported about a transverse axis approximately coincident with that of such cross-sectional curve, and means adapted to correlate rotative movement of said table and oscillatory movement of said spindle, said means including a template movable in a rectilinear direction, said template being operatively connected with said table to rotate the same, and a finder movable transversely of and interengaging with said template, said finder being operatively connected with said spindle to oscillate same.

7. In mechanism of the character described, the combination of a turntable adapted to support a tire-mold or like article, having an annular groove of curved cross-section to be engraved, a rotary cutter-spindle oscillatorily supported about a transverse axis approximately coincident with that of such cross-sectional curve, and means adapted to correlate rotative movement of said table and oscillatory movement of said spindle, said means including a template movable in a rectilinear direction, cable connections between said template and table, a bar movable transversely of said template and operatively connected with said spindle to oscillate same, and a finder carried by said bar and interengaging with said template.

8. In mechanism of the character described, the combination of a turntable adapted to support a tire-mold or like article having an annular groove of curved cross-section to be engraved, a rotary cutter-spindle oscillatorily supported about a transverse axis approximately coincident with that of such cross-sectional curve, and means adapted to correlate rotative movement of said table and oscillatory movement of said spindle, said means including a template movable in a rectilinear direction, cable connections between said template and table, a bar movable transversely of said template and provided with a rack, a segmental gear attached to said spindle and meshing with such rack, whereby movement of said bar serves to oscillate said spindle, and a finder carried by said bar and interengaging with said template.

9. In mechanism of the character described, the combination of a turntable adapted to support a tire-mold or like article having an annular groove of curved cross-section to be engraved, an arm radial with respect to said table, means adapted to index said table relatively to said arm, a rotary cutter-spindle oscillatorily supported about a transverse axis approximately coincident with that of such cross-sectional curve, and means adapted to correlate rotative movement of said table and oscillatory movement of said spindle, said means including a template movable in a rectilinear direction and operatively connected with said arm to oscillate same and thereby turn said table, and a finder movable transversely of an interengaging with said template, said finder being operatively connected with said spindle to oscillate same.

10. In mechanism of the character described, the combination of a turntable adapted to support a tire-mold or like article, having an annular groove of curved cross-section to be engraved, an arm radial with respect to said table, means adapted to index said table relatively to said arm, a rotary cutter-spindle oscillatorily supported about a transverse axis approximately coincident with that of such cross-sectional curve, and means adapted to correlate rotative movement of said table and oscillatory movement of said spindle, said means including a template movable in a rectilinear direction, cable connections between said template and said arm, a bar movable transversely of said template and operatively connected with said spindle to oscillate same, and a finder carried by said bar and interengaging with said template.

11. In mechanism of the character described, the combination of a turntable adapted to support a tire-mold or like article, having an annular groove of curved cross-section to be engraved, an arm radial with respect to said table, means adapted to index said table relatively to said arm, a curved surface on said arm concentric with the annular groove in the work, a rotary cutter spindle oscillatorily supported about a transverse axis approximately coincident with that of such cross-sectional curve, and means adapted to correlate rotative movement of said table and oscillatory movement of said spindle, said means including a template movable in a rectilinear direction, operative connections between said template and said arm including a flexible member contacting with the curved surface on the latter, a bar movable transversely of said template and operatively connected with said spindle to oscillate same, and a finder carried by said bar and interengaging with said template.

12. In mechanism of the character described, the combination of a turntable adapted to support a tire-mold or like article, having an annular groove of curved cross-section to be engraved, an arm radial with respect to said table, means adapted to index said table relatively to said arm, adjustable means on said arm adapted to present a curved surface concentric with the annular groove in the work irrespective of the radial distance between such surface and groove, a rotary cutter spindle oscillatorily supported about a transverse axis approximately coincident with that of such cross-sectional curve, and means adapted to correlate rotative movement of said table and oscillatory movement of said spindle, said means including a template movable in a rectilinear direction, operative connections between said template and said arm including a flexible member contacting with the curved surface on the latter, a bar movable transversely of said template and operatively connected with said spindle to oscillate same, and a finder carried by said bar and interengaging with said template.

13. In mechanism of the character described, the combination of a rotatable work-holder, a rotary cutter-spindle oscillatory about a transverse axis, and means adapted to correlate rotative movement of said holder and oscillatory movement of said spindle, said means including a template movable in a rectilinear direction, cable connections between said template and said holder, a bar movable transversely of said template and operatively connected with said spindle to oscillate same, a finder carried by said bar and interengaging with said template, and manually operable means for reciprocating said template and oscillating said spindle, respectively.

14. In mechanism of the character described, the combination of a turntable adapted to support a tire-mold or like article, having an annular groove of curved cross-section to be engraved, a rotary cutter oscillatorily supported about a transverse axis above said table, means for shifting such axis relatively to the plane of said table, means for shifting said table transversely of its axis, and means including a template in the form of a pattern of the design to be cut, said template being adapted to correlate rotative movement of said table and oscillatory movement of said spindle.

15. In mechanism of the character described, the combination of a turntable adapted to support a tire-mold or like article, having an annular groove of curved cross-section to be engraved, a rotary cutter oscillatorily supported about a transverse axis above said table, means for shifting such axis relatively to the plane of said table, means for locating said table in predetermined position in a direction transverse of its axis, means for shifting said table from and returning same to such position, and means adapted to correlate rotative movement of said table and oscillatory movement of said spindle.

Signed by me, this 17th day of January, 1922.

GEORGE E. ECKLER.